June 24, 1930. L. MARMONIER 1,768,128
GYROSCOPIC GROUP FOR AUTOMATICALLY STABILIZING AND STEERING AEROPLANES
Filed June 29, 1927 9 Sheets-Sheet 1

INVENTOR
L. Marmonier

Patented June 24, 1930

1,768,128

UNITED STATES PATENT OFFICE

LOUIS MARMONIER, OF LYON, FRANCE

GYROSCOPIC GROUP FOR AUTOMATICALLY STABILIZING AND STEERING AEROPLANES

Application filed June 29, 1927, Serial No. 202,336, and in France July 2, 1926.

The present invention relates to the assembly of mechanisms adapted to ensure the automatic piloting of an aeroplane, that is to say, to faithfully reproduce all the operations which the aviator would affect in order to obtain longitudinal and transversal stabilization of the aeroplane and its pointing in a determined direction.

This device, which designed under the name of "Aeropilote" undertakes by itself alone the conduct of the aeroplane, can also by means of a special device only be used by the aviator as a secondary pilot, that is to say, with the object of simply assisting in his manœuvres, without him having to abandon the control levers of the aeroplane.

Nevertheless, an aeroplane is not necessarily stabilized if it occupies a position which is invariably horizontal, in particular if it is placed in an element which changes its conditions of equilibrium at each instant. It is submitted to the action of the wind in which it performs its evolutions, to the loss of relative speed, to ascending and descending winds, to air pockets, etc. Moreover, it ought to be inclined in turning while risking the fall on the wing if the relative side wind becomes too violent. When it is guided automatically, a rigid pointing does not permit it to follow good direction if the drift winds are not taken into account.

For all these reasons, it is indispensable to add to the true planes of invariable position, speed and direction registering members for the relative wind in which the aeroplane is moved, so as to conjugate their effects with those of the stabilizer base, and thus to constitute the real stabilizer control.

Now, the fact of gravitating around this control indicates that the aeroplane is out of equilibrium. It is thus that the "Aeropilote" intervenes in order to correct it, the correction couple being a direct function of the extent of the lurch.

This correction couple would however be insufficient if the "Aeropilote" simply transmitted to the planes of the aeroplane an angular deviation equal to the angle formed by the non-equilibrium position of the aeroplane and the stabilizer control; it is thus indispensable to go through these manœuvres quicker and more energetically in the case when the lurch becomes dangerous to the safety of the aeroplane.

Consequently, the "Aeropilote" has a device which exactly reproduces the operations that the aviator would carry out in like circumstances.

Moreover, in addition to giving the aviator all desirable safety the use of the Aeropilote is suitable for realizing the following conditions:—

1st. Permitting the pilot to uncouple it completely, instantaneously, and at any moment so as to take over the piloting of the aeroplane himself.

2d. Causing the automatic and instantaneous coupling of the control levers of the aeroplane when the gyrostats or the servo-motor are out of order, and to warn the pilot at the same time.

3rd. Permitting the aviator to pass instantly from the use of the Aeropilote as a supplementary manœuvring member to its use for the general control of the aeroplane, or reversely, permitting him also to use the Aeropilote only for its stabilization when he keeps to himself the control of direction or reversely.

4th. When the aeropilot is used for the general control of the aeroplane, the pilot ought to be able to make it rise or fall at will, to steer it, or to modify the point of direction without having to discard the servo-motor.

5th. He ought to be able to augment or diminish at will the amplitude of the correction couple of the planes of the aeroplane for a determined lurch.

All these characteristics are realized by the assembly of mechanism called "Aeropilote" forming the object of the invention, and of which one constructional form is described and shown on the annexed drawings.

Figure 3 is a plan view of the gyroscopic group, of the two longitudinal and transversal uncoupler-correctors and of the levers, rods, wires, and connecting differentials of the stabilizer controls.

Fig. 15ª is another view of the gas control device.

Fig. 18ª is a detail of the pilot seat.

Figures 1, 2:
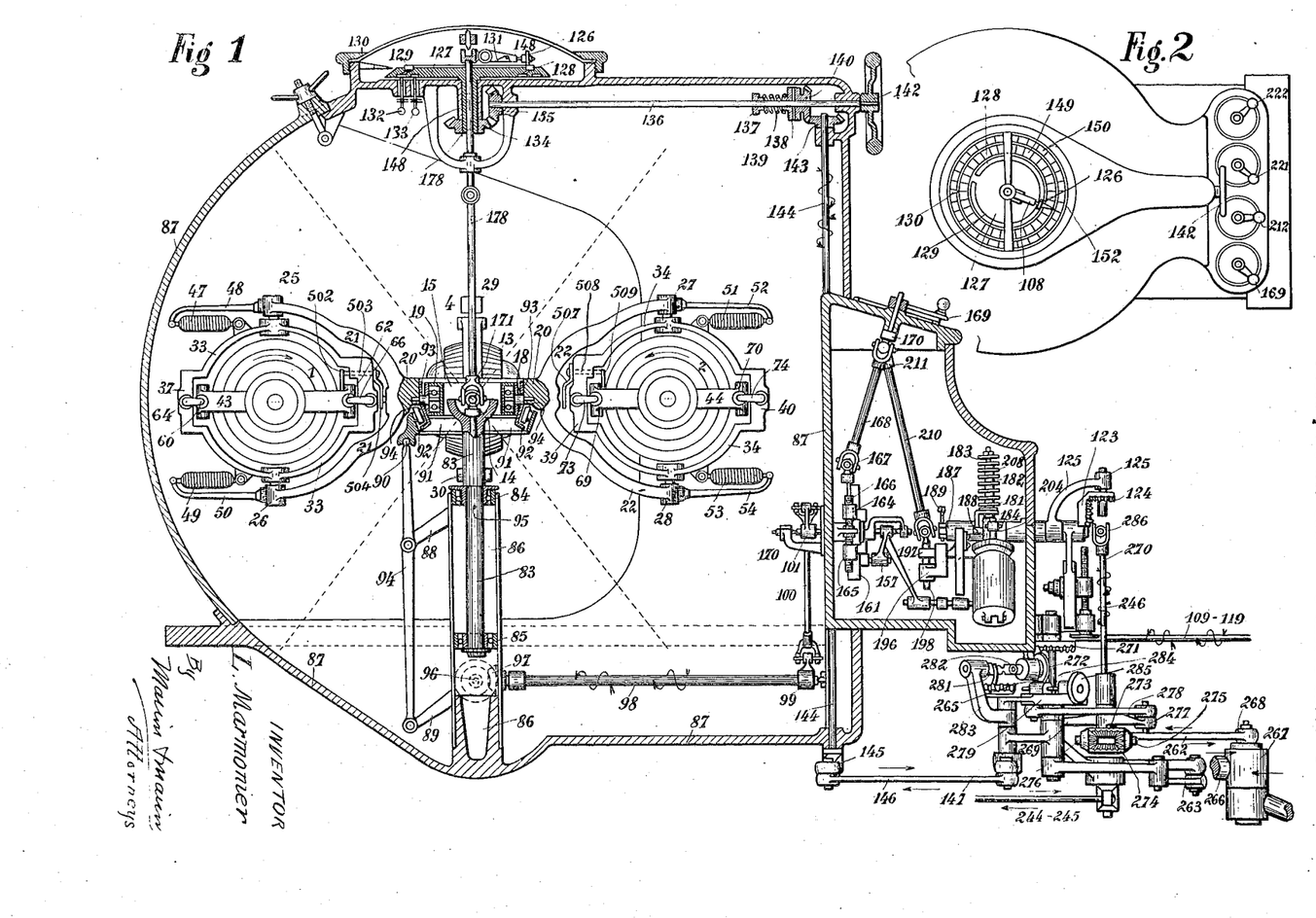
Figure 1 shows, in elevation, a section of the group of four gyrostats, a view of the device called the "unlocker-corrector" and of the rods, levers and connecting differentials between the servo-motor and the three stabilizer controls, the longitudinal, transversal and of direction.
Figure 2 is a plan view of the casing of the gyroscopic group, of the automatic steering rose, of the regulating wheel of the automatic steering, of the control handles of the two uncoupler correctors.

The gyroscopic group employed comprises four gyrostats 1, 2, 3, 4 arranged in cross form and in balance around their central pivotal and suspension point 13, which coincides with their centre of gravity.

Each of these gyrostats is mounted on universal joints in order for it to keep "three degrees of liberty", and is connected to a frame which supports them by a flexible connection such that the centres of rotation of two opposite gyrostats pass through the same vertical plane.

In that application to aviation, the longitudinal stabilization is controlled by a vertical rod 94, connected to the support 86 by a parallelogram constituted by the two levers 88 and 89. The end of the rod 94 has a ball whose counterpart is fixed to a circle 91 on which eight rollers 92 are turnable and of which four move in a circle on the upper rolling track 94 which is integral with the support frame 20 for the gyrostats and the four others on the rolling track 93 which is fixed to the same frame 20.

As the rod 94 prevents the circle 91 turning, each longitudinal oscillation of the support 86 around the gyroscopic group is translated by a pivoting of the levers 88 and 89 around their axes 95 and 96. The lever 89 communicates its rotation to a set of bevel wheels 97 which the shaft 98 continues in one direction or in the other, the said shaft acting in its turn on the lever 99, on the rod 100 and the lever 101 which puts into action the longitudinal uncoupler. The same arrangement is adopted for the lateral stabilization. The directives of the group of gyrostats are thus transmitted to the lateral uncoupler by the rod 102 (Fig. 3) the lever 103, the rod 104, and the lever 105 of the unlocker.

The directives of the gyroscopic group on the direction are registered by the universal joint 171 (Fig. 1) whose pivotal axis coincides with the pivot 13. This universal joint is fixed on one side to the cup 14 and on the other to the shaft 178 which is connected to the trolley 148. This trolley is set in azimuth on any point whatever on the horizon and that orientation will remain invariable as soon as the tores have been thrown.

The directives of the group being received on the casing 87 it remains to transmit them to the planes of the aeroplane. To effect that, servo-motors subjected to electrical transmitters are used. As soon as the aeroplane is inclined on the group, the transmitter connects a contact which, through a circuit, sets the corresponding servo-motor into action. But, at the same time, as this acts on the planes of the aeroplane, there is established a recoil which breaks the circuit and limits the movement of the servo-motor to the extent of the initial inclination.

Figures 4, 5, 6:
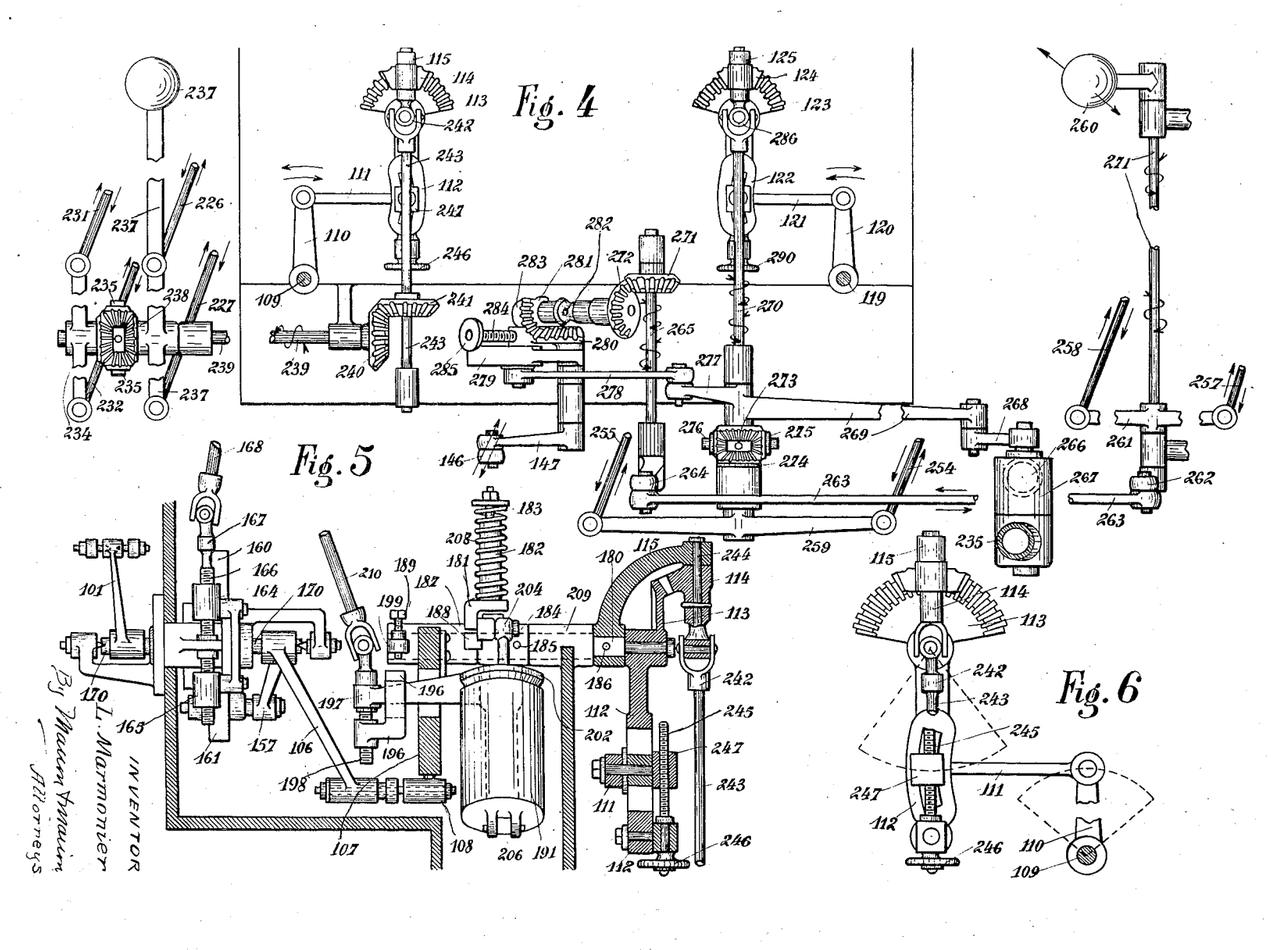
Figure 4 is a side view of the levers, rods, wires, and connecting differentials of the stabilizer controls with the hand operating levers and the automatic operating levers.
Figures 5, 6, 7, 8, 7ª and 8ª, show the details of construction of the two longitudinal and transversal unlocker-correctors.
Figure 5:
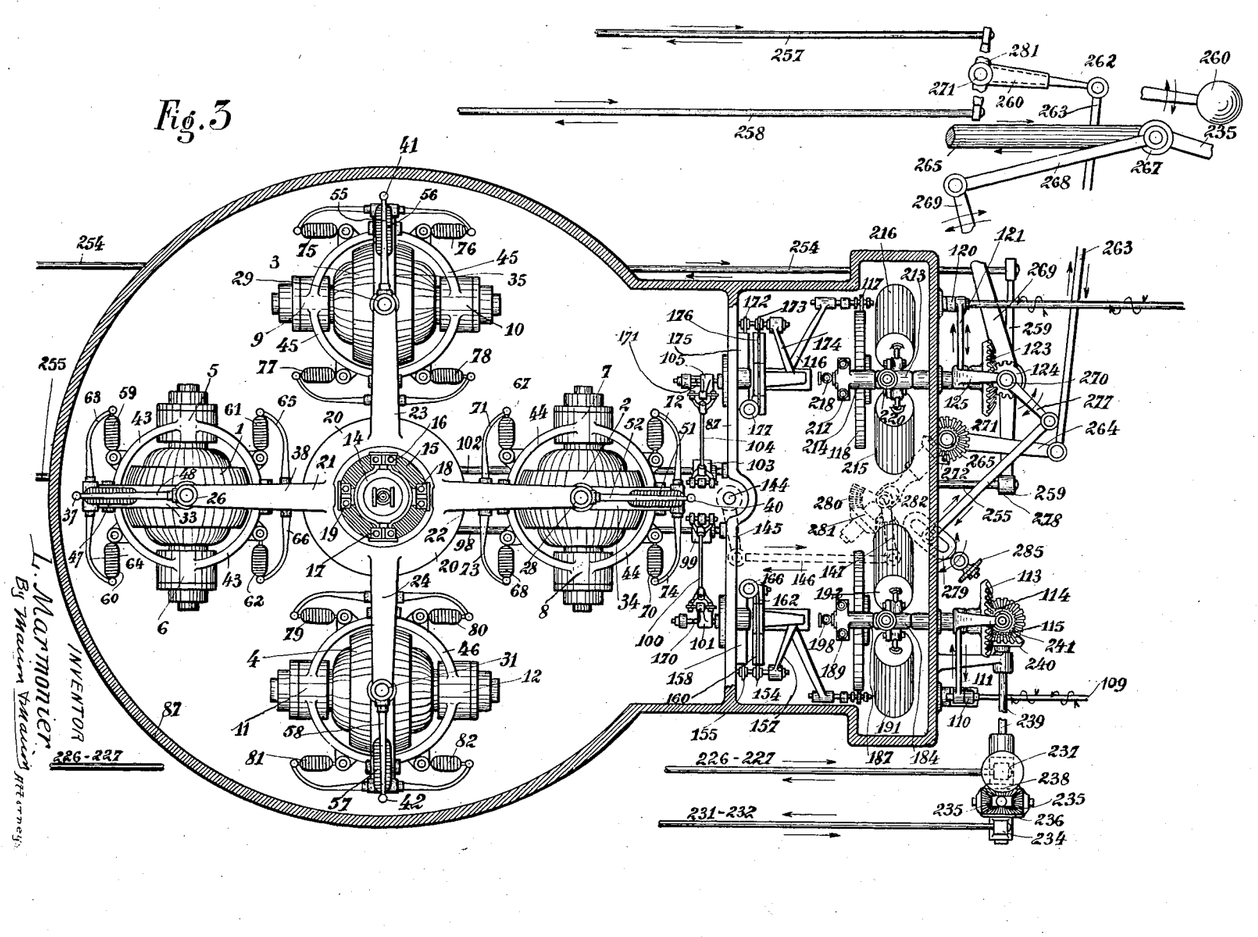

For the longitudinal stabilization, the subjection of the servo-motor is established by the trolley 108 (Figs. 1, 3, 4, 8) integral with a lever 106 which is itself submitted to the alternate movements of rotation of the lever 101 receiving the directives of the gyroscopic group. The circuit is established between the trolley 108 and the recoil sector 107 on which are fixed the contact subjection contractors of the servo-motor. The recoil of the servo-motor to the recoil sector 107 is produced by the shaft 109 (Figs. 3 and 4)

which is connected to the servo-motor, the lever 110, the rod 111, the regulating balance 112 and the differential 113, 114, 115, of which we shall examine the role in course of time. This differential is connected to the recoil sector 107 by other members of which the object will be indicated hereafter.

In the lateral stabilization, the subjection of the servo-motor is established by the trolley 117 (Fig. 3) integral with levers 116 and 105 and the recoil sector 118. This sector is connected to the corresponding servo-motor by the shaft 119 (Figs. 3 and 4) the lever 120, the rod 121, the regulating balance 122 and by the differential 123—124—125.

For the automatic steering the subjection of the servo-motor as well as the recoil mechanism are composed of the trolley 108 connected to the group. It carries a contact rowel 126, acted upon by the tension spring 131. The rowel 126 establishes contact with one of the half sectors 128 or 129 according as the aeroplane changes its direction to the right or left from the point of orientation determined by the gyroscopic group.

The half sectors 128 and 129 are fixed on the orientable disc 127 and in electrical connection with the steering servo-motor through contact makers 132—133.

The recoil of the servo-motor or orientable disc 127, is established through the lever 147 (Fig. 1) the rod 146, the lever 145 keyed on the shaft 144, the bevels 140—143, the shaft 136, the bevels 135—134 whose pinion 134 is keyed on the orientable disc 127 which turns in the boss 148.

As the application of the gyroscopic group in the automatic steering only permits the trolley 108 to orientate on a point, in azimuth, there is need to rectify this point by an angle of azimuth formed between the trolley 108 and the direction to be followed by the aeroplane.

To effect this, the movable rose 149, arranged on the orientable disc 127 has been graduated in degrees as well as the fixed rose 150 of the casing 87. Knowing the direction that the aeroplane ought to follow, by regulating the orientable rose 149, on the fixed index 130 to the same degree as the angle of azimuth 152 formed between the trolley 108 and the fixed rose 150, the aeroplane will be pointed in the proper direction.

The pilot can make the point either in advance or in flight by the small wheel 142 arranged externally on the casing and mounted directly on the shaft 136. He can thus cause the movable disc 127 to pivot in the same direction for the shaft 136 is only connected with the pinion 140 through a friction coupling 139 locked by the spring 138 and the locking nut 137, which leaves to it a relative liberty.

The device called "unlocker" which is mounted between the servo-motor and the group of gyrostats, functions in the following manner:—

The unlocker-correctors which may be of different models and whose arrangement described above is only given by way of example, have as their essential object to transmit a large amplitude of operation to the correcting planes of the aeroplane, through the intermission of the servo-motors, when the position of the aeroplane becomes dangerous for its equilibrium.

Figures 7, 7A:
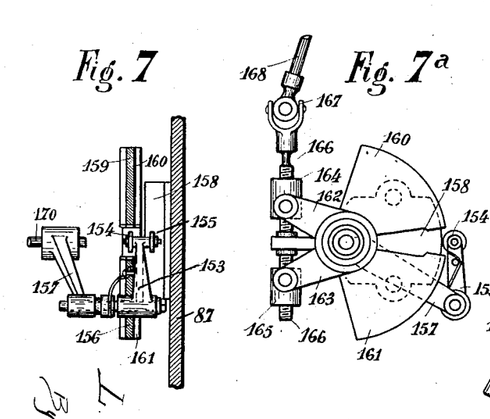

They comprise two distinct elements, the unlocker proper and the corrector which transmits the directives of the stabilizer control to the servo-motor. For the longitudinal stabilization; the unlocker is composed of the trolley 153 (Figs. 7 and 7ª) arranged at the end of the lever 157 keyed on the same shaft 170 as the lever 101; the latter connected to the gyroscopic group.

The trolley 153 carries two contact rowels 154—155 one of which, the rowel 155, rolls on the rolling track 158 which is fixed to the casing 87. The other rowel 154, which in the position of rest of the unlocker is dismounted, can by pivoting catch two sectors 160 and 161 each having a contact surface 156 and 159. The sector 160 is fixed to the branch 162 integral with the nut 164 while the sector 161, fixed to the branch 163 is integral with the nut 165 in which passes the regulating screw 166 which also controls the nut 162. That screw carries at its end a universal joint 167 connected to a shaft 168 which is actuated from the exterior by a handle 169 as the threads of the regulating screw 166 are right handed, for the nut 164, left handed for the nut 165, all rotation of the screw 166 will have for effect to lengthen or shorten the two sectors 160 and 161 and consequently the angle of incidence of the contact makers 156 and 159.

The corrector of the "unlocker" comprises as an essential member, the recoil sector 107 carrying three contact current makers 193, 194, 195 (Fig. 8ª) and the contacts 200 and 201. This sector is fixed to the sleeve 187 which can journal on the shaft 180 which itself pivots at 209. The shaft 160 is keyed by the cotter pin 186 (Fig. 5) to the differential system 115—113—114 and submits in this way to all the alternative movements which are communicated to it by the servo-motor. On the other hand, the same shaft 180 is fixed to the sleeve 184 by the cotter 185. On that sleeve is keyed a support with two arms 175 which pivot lightly at 206 and 207, two iron-plated electro-magnets 191, 192, whose cores 202 and 203 act at 204—205 on two ears integral with the sleeve 187.

That sleeve 187 is permanently connected with the sleeve 184, by means of a spring-pressed stop composed of a rod 183 fixed to the sleeve 184, of a slide 182 sliding on that rod and provided at its base with a stirrup abutment 181 each brand of which rests on catches 188 formed on the sleeve 187. The slide 182 is held in constant pressure on the catches 188 by a spring 208 with regulatable tension.

Figure 8:
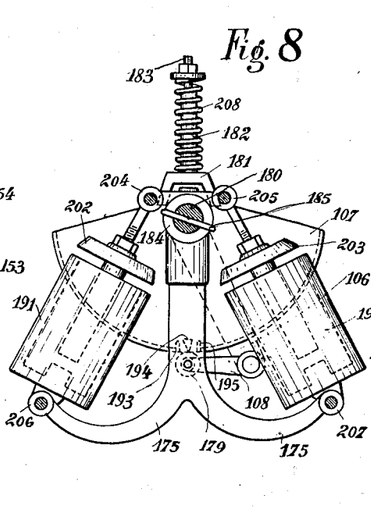
Figure 8A:
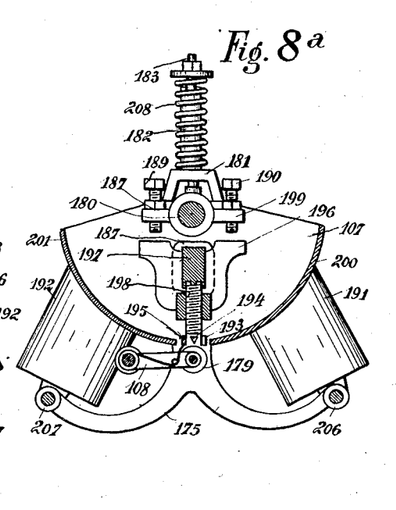

All the pivoting movement of the sleeve 184 of the electro-magnets are thus communicated to the sleeve 187 carrying the recoil sector 107 and these pivoting movements will be integral as long as the electro-magnets are not connected. On the other hand, if one of them, the electro-magnet 191, for example, receives an electric current, the core 202 is immediately attracted and through the ear 204 communicates to the sleeve 187 and to the recoil sectors 107 a complementary pivoting movement which has for effect to augment the displacement of the contacts 193—194—195 in front of the contact rowel 179 of the trolley 108 (Figs. 8 and 8ª). Nevertheless this pivoting movement cannot be produced without raising the branch 181, of the slide 182 by compressing the spring 208; also when the current ceases to flow in the electro-magnet 191, the spring 208 draws back the sector 107 into its initial position.

The current which connects the electro-magnets 191 and 192 comes from contacts 156 or 159 of the unlockers which only engage with the rowel 154 when the aeroplane is sufficiently inclined on the control stabilizer in order for the contact to be produced. The aviator can regulate at will this angle of incidence by the regulating screw 166.

The corrector also has a regulating device which has for object to give a greater or less amplitude to the connecting couple of the aeroplane by augmenting or diminishing at will the pivoting of the corrector when it is locked by the locking device. This arrangement consists of two abutment screws 189—190 fixed by two paws 199 to the sleeve 187 and consequently subjected to all its movements. By pivoting, these screws bear on a counter stop 196 which is displaced vertically by the regulating screw 198, which journals in the arm 197 with the shaft 210 (Figs. 5 and 8ª). This is driven by the universal shaft 211 and the amplitude handle 212 (Figs. 1 and 2).

After this explanation it will be seen that the unlocker-corrector only sets when the angle of incidence of the aeroplane is sufficient that the rowel 154 of the unlocker may be engaged with one of the contacts 156 or 159. Presently the corresponding electro-magnet draws the recoil 107 and considerably augments the amplitude of the correcting couple of the planes of the aeroplane. When this is corrected, it returns to its position of equilibrium and the rowel 154 breaks the circuit, the recoil sector 107 instantly returns to its normal position under the pressure of the spring 208 by drawing backward the planes of the aeroplane. These continue however to come back imperceptibly to their neutral position for it should be noticed that the action of the unlocker-corrector is only a complementary and energetic action which does not prevent the planes from inclining proportionally to the falling out of equilibrium.

As it is possible to regulate the angle of incidence and the amplitude of the couple of correction by external handles, it will be easy to determine in full flight what condition exactly suits the stabilized aeroplane, a condition variable according to its model, its speed, the atmospheric conditions, etc.

For the lateral stabilization, the unlocker-corrector is an identical model. It consists for the unlocker in the trolley lever 174, subjected to the gyroscopic group, by the two rowels 172—173 and the two opposite contact makers 176. The rowel 172 circles on the rolling track 175 fixed to the casing 87. The removal of the contact makers 176 is regulated by the screw 177 which is actuated from the exterior by the handle of incidence 221.

The members which compose the corrector are: the trolley 197 branched on the lever 116 which is subject to the influence of the stabilizer group, the sleeve 213 integral with the electro-magnets 215—216, the sleeve 214, integral with the recoil sector 118 and in connection with the sleeve by the spring system 220. The regulation of the amplitude of the correcting couple is effected by the abutment screw 217 and the regulating screw 218 operated from the exterior by the amplitude handle 222.

By referring to that which has just been described it is seen that the gyroscopic group with a plane invariably true cannot be utilized alone for the stabilization automatic of an aeroplane without being conjugated with other registering members of the direction and speed of the relative wind in which it moves.

Figures 19, 20, 21, 22:
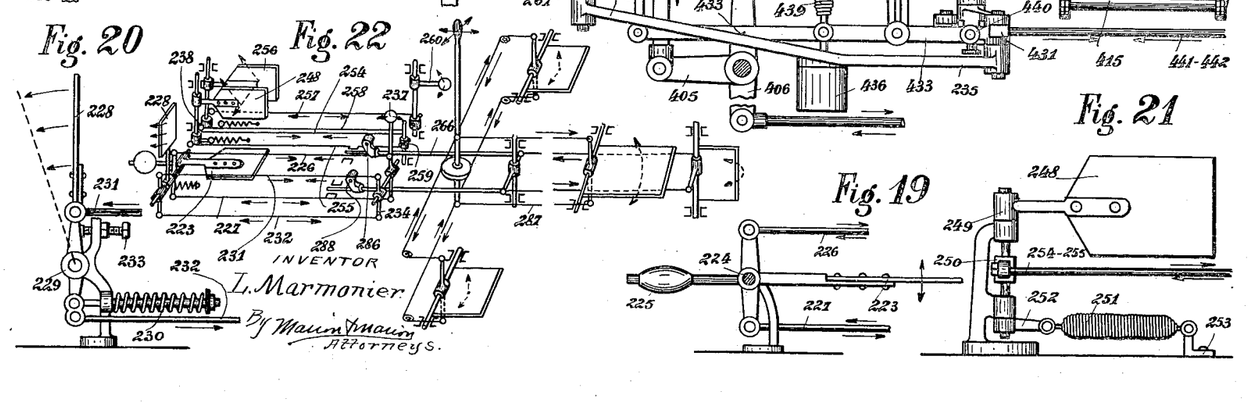
Figure 19 is a horizontal vane which registers the rising and falling winds.
Figure 20 is the plane for indicating the loss of relative speed.
Figure 21 is a vertical vane which registers the relative side winds.
Figure 22 shows the position that all the members constituting the Aeropilote occupy on the aeroplane.

These members are arranged in front of the aeroplane as antennæ so as to register the relative winds before they influence the aeroplane. For the longitudinal stabilization they consist:

(a) In a horizontal vane (Fig. 19) whose position on the aeroplane is figured at 223 (Fig. 22). That vane is composed of a horizontal plane 223 (Fig. 19) pivoting at 224 and counterbalanced by the counterweight 225. It registers the rising and falling winds and is in connection with the stabilizer group through the wires 226 and 227 and the hand operating lever 237.

(b) A vertical plane 228 (Fig. 20) which is arranged on the aeroplane facing in its direction and which has its object to register the relative speed of the aeroplane in the wind, and especially its loss of speed. This plane 228 pivots at 229. It is held in a vertical position by the force of the wind on its back face of and by an abutment screw 223, whilst an antagonistic spring 230 seeks to incline it forward when the pressure exercised by the wind is insufficient, which takes place when the aeroplane has no longer the relative speed sufficient for its sustenance. By falling the plane 228 tends to cause itself to take the same position, as is explained hereafter.

The plane 228 transmits its directives to the stabilizer group by wires 231—232 and the lever 234. This is connected to the planet 236 of a differential whose opposite planet 238 is integral with the hand lever 237. The oscillations of the two planets are registered conjointly and concurrrently by the satellites 235 whose shafts are keyed on the shaft 239 which communicates them to the shaft 243 by the bevels 240—241 (Fig. 4).

It is noticed that in this device, the lever 237 which is in connection with the horizontal vane 223 can be operated by hand by the aviator, while the lever 234, indicator of the loss of relative speed, escapes at its action. The lever 237 remains in the rest position in consequence of the direction of the wind.

It has been demonstrated, on the other hand, that, for the stabilizer control to be efficient, it is necessary that the indications of the registering planes of the wind should be conjugated with the directives of the gyroscopic group.

It is with this object that the differential 113—114—115 has been provided for the longitudinal stabilization and 123—124—125 for the lateral stabilization.

It has been previously explained above that this differential received through 109—110—111 (Fig. 6) the recoil of the servo-motor and through the shaft 243, the conjugated indications of the registering planes for the wind 223—231 (Figs. 19-20—22). The oscillations of the lever 110 are transmitted to the balance with a variable travel 112 which is integral with the bevel pinion 113. On the other hand, the shaft 243 is in direct transmission with the bevel pinion 114 through the aid of the universal joint 242 whose axis coincides with the axis of the shaft 180. The pinion 114 engages with 113, while the shaft 244 journals in the sleeve of the arm 115 which is pinned at 186 on the shaft 180. All alternate rotation communicated to the shaft 243 has thus for effect to weaken or augment the transmission to the shaft 180 through the arm 115 of the oscillations of the rod 111 which is connected with the servo-motor (Figs. 5 and 6).

The oscillations of the balance 112 are regulatable by means of the screw 245 operated by the wheel 246 arranged at the hand of the aviator. By making the slide 247 slide in its lodgment, the regulating screw permits the amplitude of recoil of the servo-motor on the unlocker-corrector to be augmented or diminished.

For the lateral stabilization, the conjugation of the directives furnished by the gyroscopic group and the registering planes of the wind, are not like the preceding, for it is possible to foresee the inclination of the aeroplane in the turns. This result is obtained by connecting the steering with the latter equilibrium members. The following devices are thus provided for the lateral stabilizaton and those which correspond to the automatic steering.

Two registering planes for the relative side wind, (Fig 21) are arranged with this object, as antennæ in front of the aeroplane. One registers the drift winds for the automatic steering and the other the side winds, the latter exercising all its influence in the turns in order to avoid a too great inclination and the risks of a sliding on the wind.

These planes are of the same model (Fig. 21) and composed of a vertical plane 248 pivoting horizontally at 249. They are arranged in the direction of the aeroplane and held in position by a regulatable antagonistic spring 251, fixed on one side to the square 253, on the other to a small lever 252 keyed on the shaft 249. Two levers 250 and 238 transmit the indications of the plane 248 and 256 to four wires which for the transversal equilibrium are the wires 254 and 255 which are respectively connected to double levers 259 and 251 and for the steering, the wires 257 and 258 which are connected to the double lever 261.

The recoil movement of the servo-motor of the automatic steering arises from the bar 3 which communicates it to the sleeve 267 and to the sliding bar 266 on which is keyed the right pedal 286 (Fig 22) used by the aviator to actuate the steering rudder by foot. The left slide 287 (Fig. 22) and the left pedal 288 are not shown in Figs. 1, 3, and 4.

The advance and recoil of the slide 266 are communicated to the lever 269 (Figs. 1 and 4) by the rod 268. On this lever is fixed at 273 the planet of a differential whose other planet 274 is integral with a lever 259 of the drift plane 248. The shaft of the satellites 275 and 276 is keyed on the shaft 270 which for the second differential 123—124—125 is in relation with the recoil sector 118 of the lateral equilibrium. In consequence the recoil sector 118 receives not only the directives of the gyroscopic group with a plane of horizontal truth, but also those of the steering rudder each time that turn is put on so as to compel the aeroplane to incline on the horizon and make its turn conveniently. The lateral control also submits to the influence of the drift winds through the double lever 259, in order to resist falling on the wing. The side winds acting on the vane 248 thus put these members in action which avoid in effect a too accentuated inclination of the aeroplane during the turns. It is to be noticed that that vane acts independently of the aviator while the vane 256 connected to the hand lever 260 is left to his disposition in order to cause the aeroplane to turn by using the aeropilote. This lever 260 is kept in position by the pressure of the wind.

The relation between the control of the automatic steering and the servo-motor is ensured by the same lever 269 which acts on the lateral equilibrium.

343 which advances and moves backward in the slide 344. The slide lever 303 is keyed at the other end to the shaft 304 to which it communicates all the alternate rotational movements that are transmitted to it by the piston 301.

The latter acts under the suction produced locks the brake when the current ceases to flow in the electro-magnet 365.

In the rest position of the longitudinal control the rowel 179 (Fig. 8) is in connection with the central piece 194 of the brake drive. If the equilibrium is upset the rowel 179 enters into contact with one of the contact pieces 193 or 195 which, connecting one of the electro-magnets 306 or 307, causes the piston 301 to advance in the desired direction. But at the same time, as this piston advances it acts on the recoil members which put it into connection with the sector 107, which breaks the current flowing between the rowel 179 and the connected contact piece. That rowel reestablishing the current with the electrobrake 351—365 through the central contact piece 194 the advancement of the piston is prevented.

The connection of the longitudinal servo-motor with the recoil section 107 is ensured by bevel pinions 367—368 (Fig. 10) the latter being keyed on the shaft 109 (Figs. 1, 3, 4 and 10).

Figure 10:
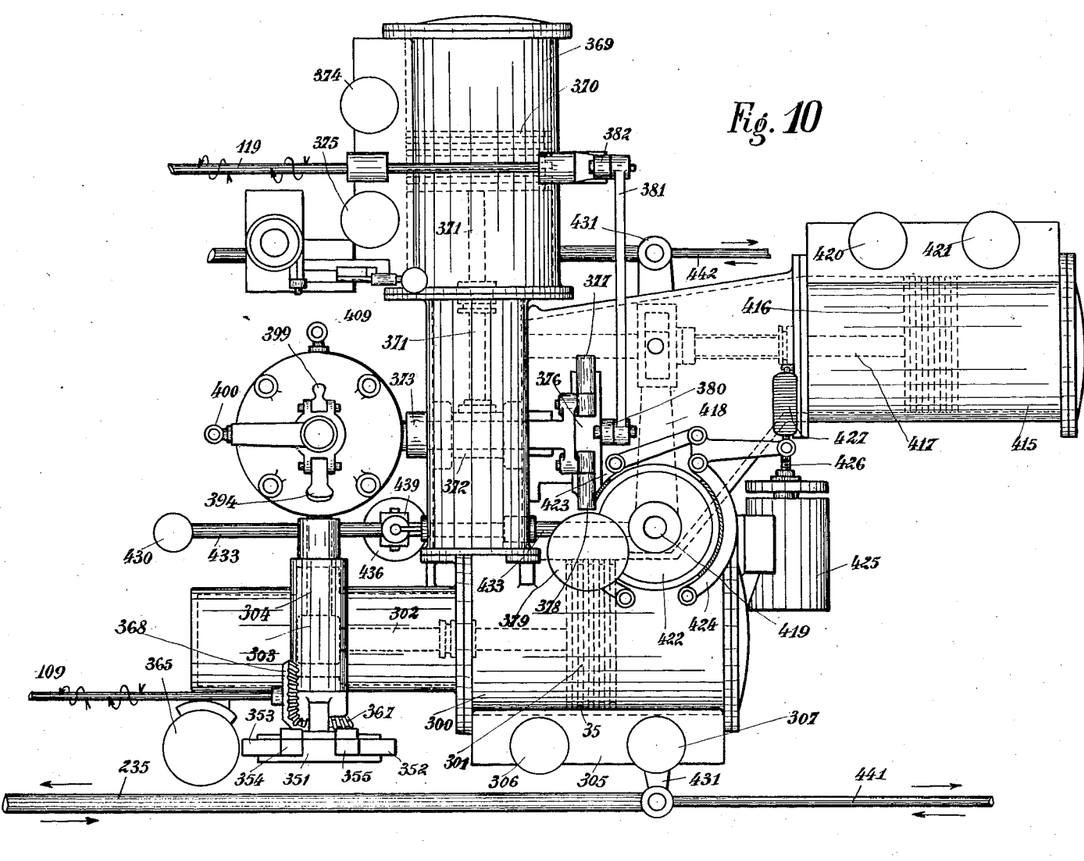
Figure 13:
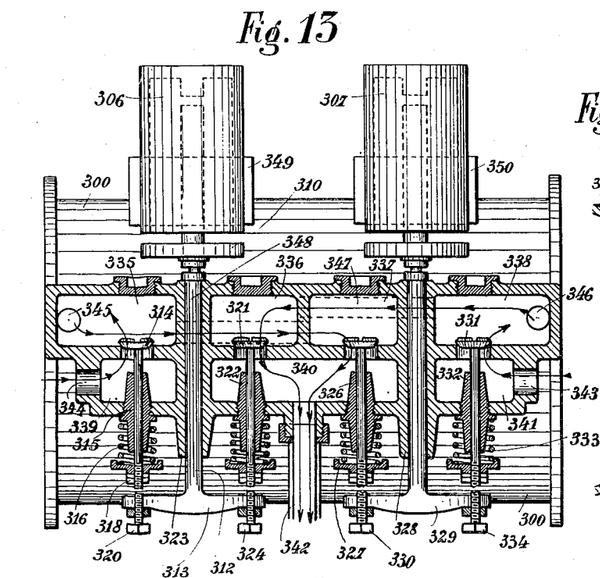
Figures 13 and 14 are details of construction of the driving device for the servo motors operated by suction (or compressed air).

The transversal servo-motor comprises the piston 370 sliding in the pump casing 369 and operating the lever 372 which makes the shaft 373 pivot in two directions. The electro-mechanical brake is composed of the brake drum 376, jaws 377—378 and the square 379. As to the connection of the lateral servo-motor with the corresponding recoil sector this is ensured by the lever 380 which is keyed on the shaft 373, the rod 381, the lever 382 and the shaft 119, (Fig. 10).

The steering servo-motor comprises the pump body 415 (Figs. 9 and 10) in which the piston 416 moves operating the rod 417, the slide lever 418 and vertical shaft 419. The braking arrangement at rest is composed of a brake drum 422, two jaws 423—424 the electro-magnet 425 for driving the brake the locking lever 426 and the opposing spring 427.

On the central shaft 419, which is actuated by the servo-motor, is arranged a double lever 431 which is connected at the front to the coupling bars 235. These bars are jointed at 267 (Figs. 1, 3 and 4) with slide bars 266 and 287 which carry the two foot-actuated pedals 288 and 286 (Fig. 22) used by the aviator in order to operate the steering rudder by the help of a double lever 431 and wires 441 and 442 leading to the servo-motor.

The two longitudinal and transversal servo-motors used in order to operate the planes of the aeroplane, a single lever (Fig. 11) which receives, through the shaft 373 the alternate rotational movements of the lateral servo-motor and through the shaft 304 those of the longitudinal servo-motor, these movements being able to be produced together or simultaneously in a different proportion.

The shaft 373 has at its extremity an enlargement 374 which is cased in the mortise 531 of a spherical shell 375. Perpendicularly to the mortise 531, the shell 375 has a groove 532, in which is adjusted a fork arranged at the extremity of the shaft 304, so that the shell constitutes a ball joint subject to all the movements of the shafts 304 and 375. On the shell 375 are arranged two half spherical caps 533 which are keyed on the shell 375 and on the latter journal in all directions two other half caps 534 integral with the operating lever 535. Normally this lever can pivot in all directions around the cap 533 and in order to fix it, there has been provided on the upper cap 533 an opening 394 in which is encased the trunnion of a shaft 393 fixed to a rod 384, which connects it with a handle 536. That rod is kept lifted up by a spring 398 which rests on the shoulder 397. On the other hand an encased electro-magnet 389 compresses that rod through the lever 385 jointed at 386 and 387 with the object of keeping the trunnion 394 locked in the lodgment which is arranged for it.

Consequently as soon as the electro-magnet 389 is connected, the lever 535 will be connected with the servo-motor and the current will cease to be broken. So the aviator can himself unlock the lever by operating the handle 536.

The transmission of the movements of the lever 535 to the planes of the aeroplane is made by the bar 404 articulated to the flexible cap 400—402—403, on the one hand, and on the other hand to the secondary lever 405—406 which, through the wires 407—408 is connected with the tail plane.

The warping planes are actuated at 409—410—411—412 by a flexible ball articulation and by the lever 413.

The steering also comprises an automatic or hand unlocking device, composed of a lever 433 (Fig. 9) pivoting at 435 and connected at one of its extremities to a sliding clutch 440 which locks a double lever 431 which is connected with the steering rudder of the aeroplane by the wires 441—442. At its other extremity, the lever 433 is articulated to a vertical rod 430 arranged beside the pilot for locking or unlocking the automatic steering. On the other hand, the lever 433 is connected at 438 to an electro-magnet 436 whose core 437 being in the locking position, has for effect to lock the clutch 440 to the lever 431. When that effect ceases the opposing spring 439 unlocks the clutch and at the same time the steering servo-motor.

The aviator has thus at hand all the elements necessary for the instant unlocking of the servo-motors and can take over the steering of the aeroplane at any instant. The electro-magnets 389 and 436 which lock, one the stabilization lever 535, and the other the automatic steering form part of a safety device described hereafter.

This arrangement is completed by a third safety apparatus, which cuts off over the inlet of gas to the servo-motors.

Figures 14, 15, 15A:
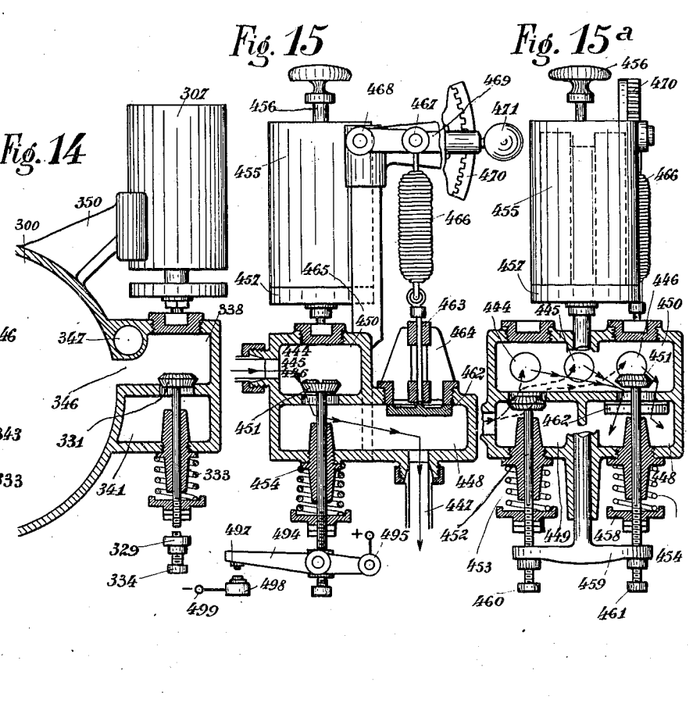
Figure 15 shows a device automatically cutting off the inlet of gas to the servo-motor and also allowing the force of the gas on the servo-motor to be regulated at will.

This apparatus comprises a chamber 450 (Figs. 15 and 15ª) where are connected the three tubes 444—445—446 of the three servo-motors and two other chambers 448 and 449. From the chamber 448 the suction pipe 447 leads, forming the source of energy of the servo-motors. It communicates with the chamber 450 through the valve opening 451 and, on the other hand, the chamber 450 communicates with the chamber 449 through the valve 452.

The two valves 451 and 452 are raised by the electromagnet 455 by means of the core 457, of the rod with two branches 458 and 459 and the two regulating screws 460 and 461.

When the servo-motors are working, the gas circulates through the chambers 448 and 450 and through the valve 451 so as to reach them. But immediately the current is broken in the electro-magnet 455 the core 457 falls again as well as the valves 452 and 451. The latter cuts off the gas while the valve 452 puts the servo-motors into communication with the atmospheric air and consequently renders them inactive. The pilot can produce the same result by pressing on the handle 456, for the tension of the valve springs 453 and 456 is sufficient to hinder the electromagnet 455 from raising the valves without the assistance of the pilot, when it would be connected again.

The same apparatus is provided with a device for permitting the pilot to vary at will the strength of action of the gas on the servo-motors. That strength can be regulated from complete inaction up to the automatic and integral operation of the planes of the aeroplane. This is so with the object of permitting the aviator to use the Aeropilote as a supplementary aid or for the automatic piloting of the aeroplane. This device consists of a valve 462 (Fig. 15) whose rod 463 slides in a rod 464. The rod 463 is raised at its upper part by a spring 466 whose tension is regulated by a lever with the stop notch 469. The lever pivots around the sector with the stop notch 470 and according to the position which it occupies, the air depression is more or less strong in the chamber 450. A similar disposition, but reversed, could be used if the servo-motors were operated by compressed air instead of being operated by suction. The same applies to a hydraulic servo-motor.

Figures 9, 11, 12:
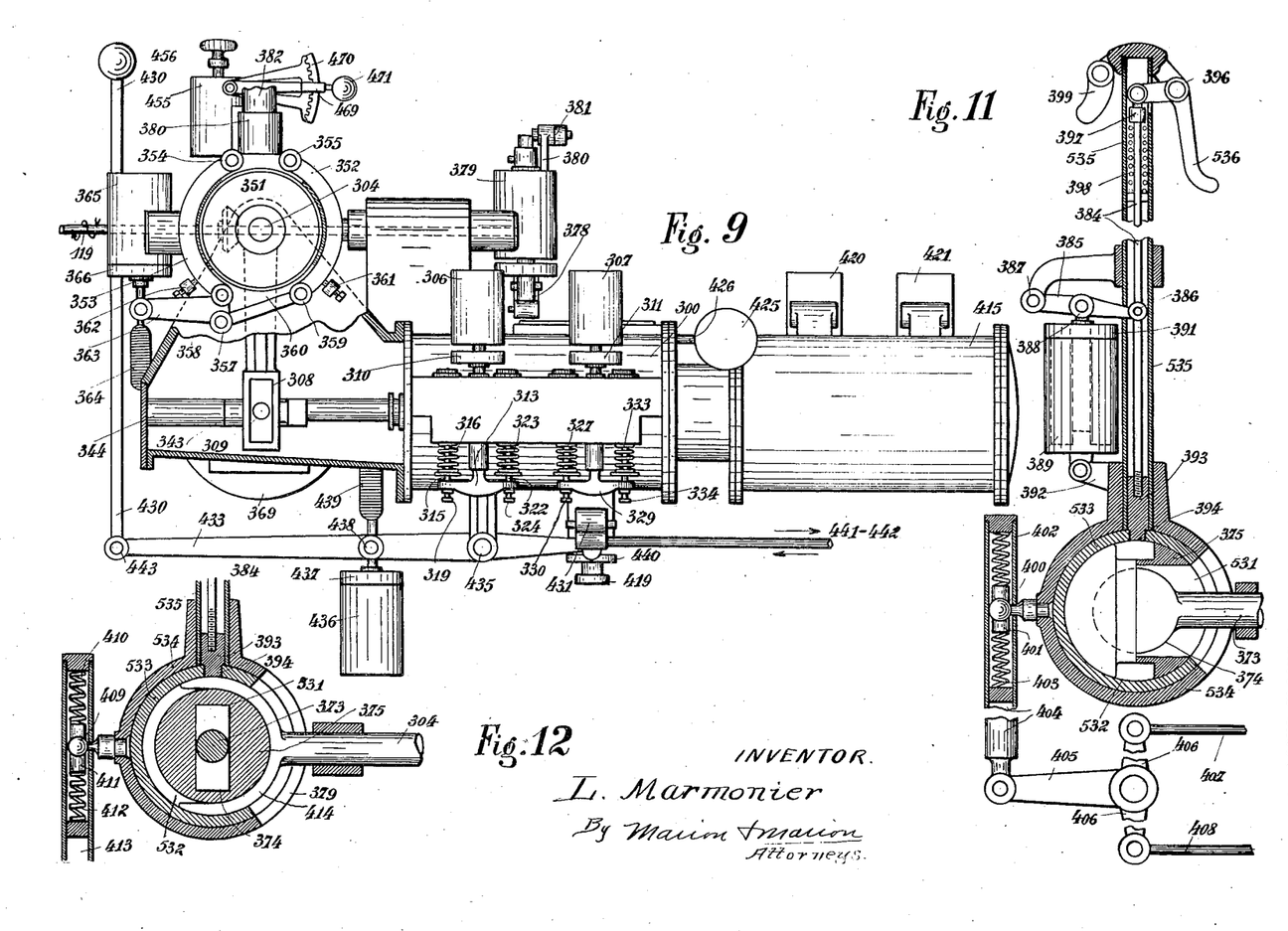
Figures 9 and 10 are elevations and plan views of the suction of air compression servo motor.
Figures 11 and 12 show the control lever for the depth rudder and for the warping planes of the aeroplane.

In the description of the three servo-motors an electro-brake device has been studied acting during the rest position of the servo-motor. This electro-magnet could be replaced by a more flexible pneumatic system consisting of a piston 479 (Fig. 16) using the same air depression as the servo-motors, having in consequence a corresponding action. This piston slides in a pump casing 478 and acts on a device comprising a brake drum 472 jaws 473—474 and lever 475, similar to the electro-brake previously defined (Figs. 9 and 10). The piston is in action when the electro-magnet 481 is connected and lifts the valve 486 which makes the chamber 478 communicate with the source of air depression.

When the current ceases to flow in the electro-magnet 481, the core 482 falls as well as the valves 486—487 which cut off the gas on one side and open on the other the atmospheric communication. The opposing spring 492 unlocks the brake. The same device could obviously be used but reversed in compressed air servo-motors.

The Aeropilote which is just described allows the aviator the free disposition of the stabilization and steering lever of the aeroplane. In certain cases, however, its safety would not be completely ensured if the automatic members did not intervene, when the non-equilibrium of the stabilizer control or the disturbance of the servo-motors arises, in consequence of causes escaping his vigilance.

This will be the case for example, when one of the gyrostats ceases to turn or when it has no longer the same rotary couple as that with which it is coupled. Other causes can upset the precession of the gyrostats and modify their invariably fixed position.

On the other hand, the servo-motors can be in opposition to the directives of the controls; to over-reach the point where their action ought to be stopped. The contact makers may be burnt out and cause the stoppage of the servo-motors or its unseasonable intervention, the excitation current of the electromagnets may be broken, etc. For these reasons, it is important that the Aeropilote should possess a safety device which comes into action as soon as a cause of non-equilibrium intervenes.

This safety device consists in arranging "in series" in the same excitation circuit all the members of the Aeropilote susceptible of getting out of regulation and in providing them with a circuit breaker which interrupts the exciter current as soon as they are out of equilibrium.

The excitation current arising from the battery of accumulators 511 (Fig. 17) flows successively into the four gyrostats of the group, each of them being provided with two circuit breakers mounted between the support 20 of the whole of the group and the universal joint circles of the gyrostats. For the elements 1—2 there are the circuit breakers 502—503—504—505—506—507—508—509.

As the least precession of the gyrostats is transmitted to the universal joint circles 33 or 34, the current will be broken when these are out of equilibrium. It is the same for the element 3—4.

Figures 16, 17:
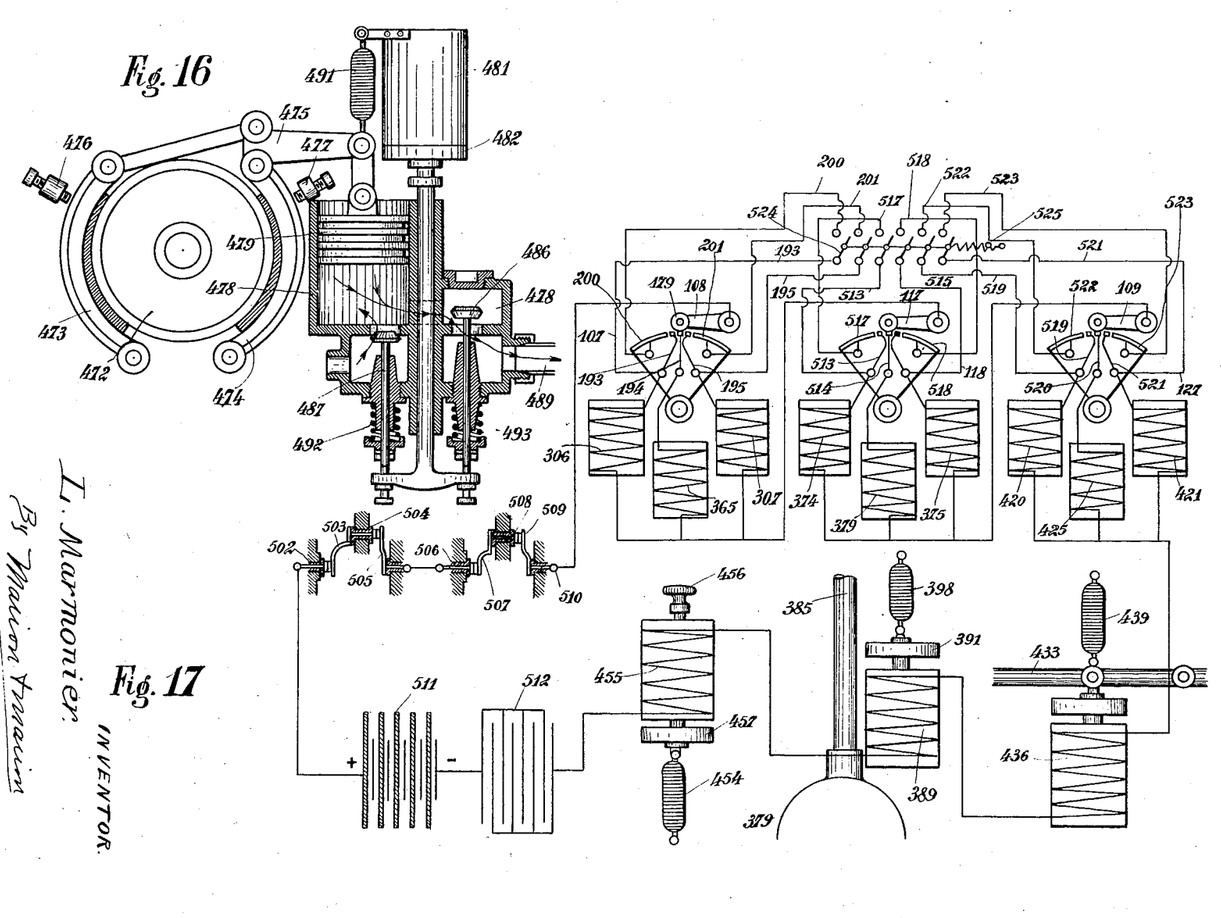
Figure 16 is a suction or compressed air servo-brake device.
Figure 17 is the scheme of the connections of the safety devices which automatically unlock all the hand control levers of the planes of the aeroplane, when the gyrostats or the servo-motors are out of order.

For the three servo-motors, the safety device is arranged in each of the recoil sectors 107—118—127 corresponding to the two stabilizations and to the steering on the sector 107 that we take as an example (Figs. 8, 8ᵃ and 17) are arranged the three contact pieces of the contact maker, the central piece 194 of the electro-magnetic brake 365 and the two pieces 193—195 of the electros 306 and 307 of the servo-motor starter. These latter contact pieces are of small dimensions and completely insulated from the two other current makers 200 and 201 arranged on the periphery of the recoil sector.

These makers being also insulated from the excitation current the latter will be broken when the rowel 179 passes beyond one of the contact pieces 193—195, which will necessarily take place if one of the servo-motors does not exactly respond to the directives of the stabilizer control to which it is connected.

The current will pass through the gyrostats and the three recoil sectors formed by the electro-magnet 436 of the steering engagement lever 433, the electro-magnet 389 which engages the stabilization lever 535, the electro-magnet 455 which cuts off the gas from the servo-motor. In consequence, when the current is broken, in one of the numerous circuit breakers referred to below, the Aeropilote will no longer have any action on the planes of the aeroplane.

Before returning to the battery of accumulators 511, the excitation current passes into the condenser 519 which absorbs the rupture sparks from all the contacts of the Aeropilote.

At the same time all these unlockings take place, the pilot is warned by a luminous signal and a vibrator, in consequence of the contact which is established between the contacts of the interrupter 499—494—495.

We have previously seen that when the rowel 179 arrives on the contact makers 200—202 of the recoil sector 107 the excitation current is completly broken, consequently the servo-motor no longer responds to any directive. In order to recall the servo-motor to its normal position it is necessary to re-establish provisionally the current in these makers.

To effect that a general locking device 524 has been provided, which is normally disconnected by the spring 525 and can only be operated by the pilot. This locking device re-establishes the current between the contact pieces and the makers 193 and 200, 195 and 201, 513 and 517, 515 and 518, 519 and 522, 524 and 523.

Figure 18:
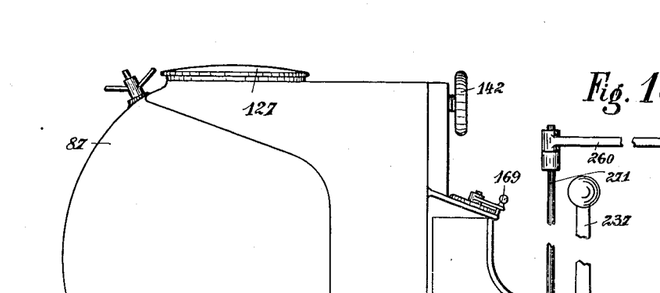
Figure 18 shows the assembly disposition of the essential members of the Aeropilote.
Figure 18A:
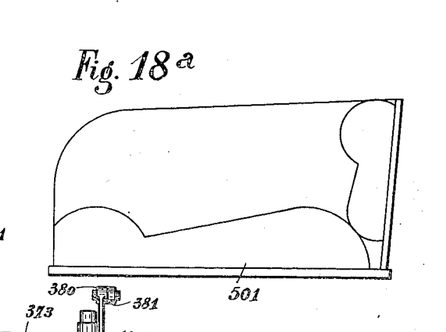

Figure 18 represents the disposition of the whole of the Aeropilote, the casing 87 containing the group being arranged in front, facing the pilot who, seated on the seat 501, has in front of him the steering control and the steering rose, the general stabilization lever 535, which operates the tail plane, and the warping planes.

The steering lever 260 is on his right and allows him to make the aeroplane turn by using the Aeropilote, and on his left is the height lever 237 which allows him to make it rise or fall.

There are also arranged within reach of his hand the wheel 142 which allows him to change the automatic steering or to make the point in full flight. Moreover, he can change the angle of incidence and the amplitude of the reaction of the Aeropilote by handles 169—212—221—222 of the two unlocking devices; regulate the strength of action of the servo-motors by the knob 471; engage or disengage the stabilization lever 535 by the handle 536 or the circuit breaker 399; engage or disengage the automatic steering through the vertical rod 430, and cut off the gas from the servo-motors by the handle 456.

The aviator can also regulate in full flight the amplitude of recoil of the servo-motor to the stabilizer controls by the regulating wheels 246—285 and 290 of the sliding balances 112—122 and 279 (Figs. 1, 3 and 4).

Figure 22 represents the position which the Aeropilote occupies on the aeroplane, the indicator planes for the wind arranged as antennæ in front of the aeroplane, the Aeropilote faces the aviator. The action which is produced on the aeroplane planes being identical with the operations effected by the pilot, the said aeroplane is piloted automatically.

It is not necessary that the indicating planes for the relative wind may always have the dispositions indicated above. All other indicating apparatus or aerometers more sensitive than these planes may be employed with this object.

I claim:

1. A device for automatically stabilizing and steering aeroplanes comprising a gyroscopic group, a leverage system actuated by the relative displacements of the aeroplane with respect to the true planes of the gyroscopic group, electric feeding circuits opened or closed by action of the leverage system, electro-mechanical means operated through said electric feeding circuits, servo-motors operatively connected to the electro-mechanical means for driving the stabilizing and steering members of the aeroplane, uncoupler corrector means for bringing an automatic intervention of a servo-motor to assist the correcting coupler of the planes, and means for connecting said members to the servo-motors for automatic steering and stabilization or for disconnecting those members used by the pilot when the automatic device is not in operation.

2. A device for automatically stabilizing and steering aeroplanes comprising a gyroscopic group, a leverage system actuated by the relative displacements of the aeroplane with respect to the true planes of the gyroscopic group, electric feeding circuits opened or closed by action of the leverage system, electro-mechanical means operated through said electric feeding circuits, servo-motors operatively connected to the electro-mechanical means for driving the stabilizing and steering members of the aeroplane, electro-mechanical means ensuring an automatic uncoupling between the control of said members and the servo-motors upon breakage of one of the stabilizer control members of the servo-motors, and means for connecting said members to the servo-motors for automatic steering and stabilization or for disconnecting those members used by the pilot when the automatic device is not in operation.

LOUIS MARMONIER.